No. 763,845. PATENTED JUNE 28, 1904.
H. BÖHMLÄNDER & R. PFEIFER.
MEANS FOR SECURING THE STATORS AND ROTORS OF ELECTRICAL MACHINES IN ADJUSTABLE RELATION.
APPLICATION FILED FEB. 24, 1902.
NO MODEL. 2 SHEETS—SHEET 2.
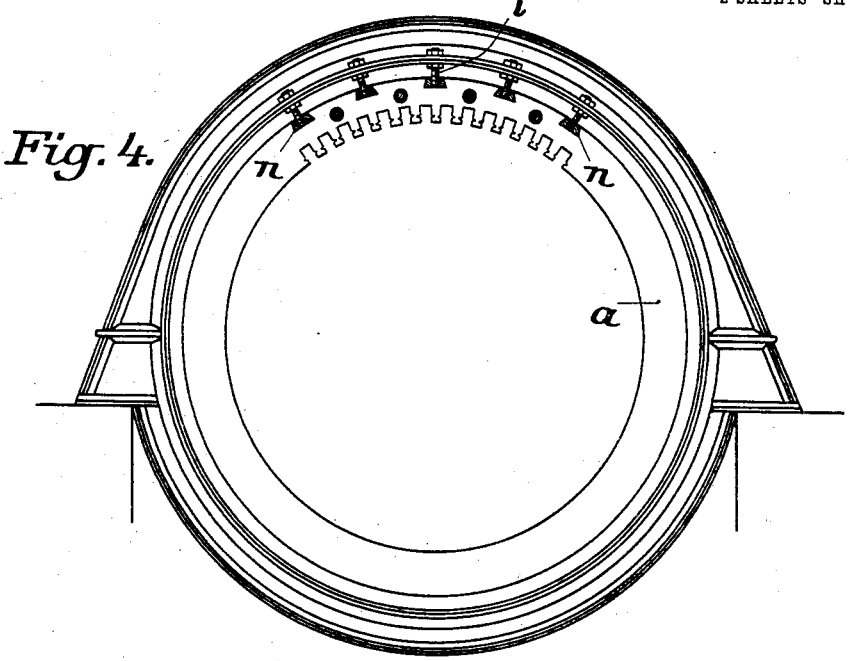
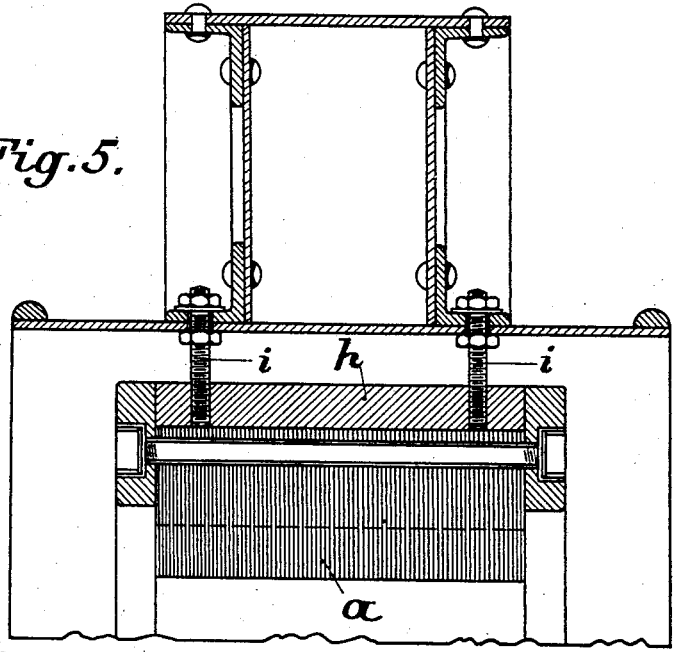
WITNESSES
Anton Gleitner
Susan McLaughlin
INVENTORS
Hans Böhmländer and
Rudolf Pfeifer
by Max George
their Attorney.

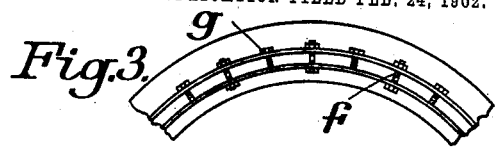
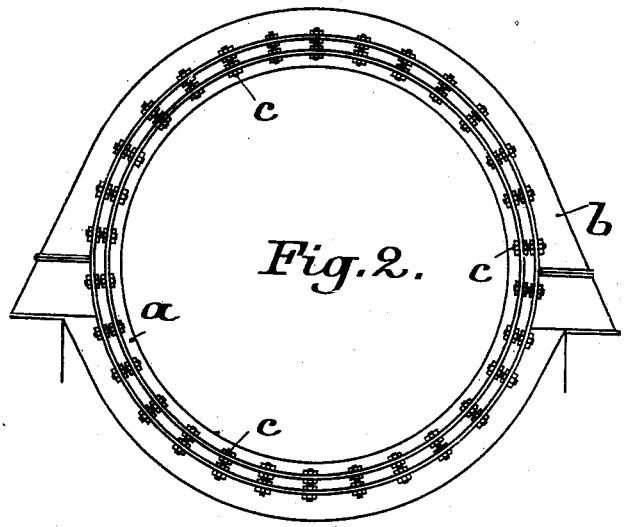
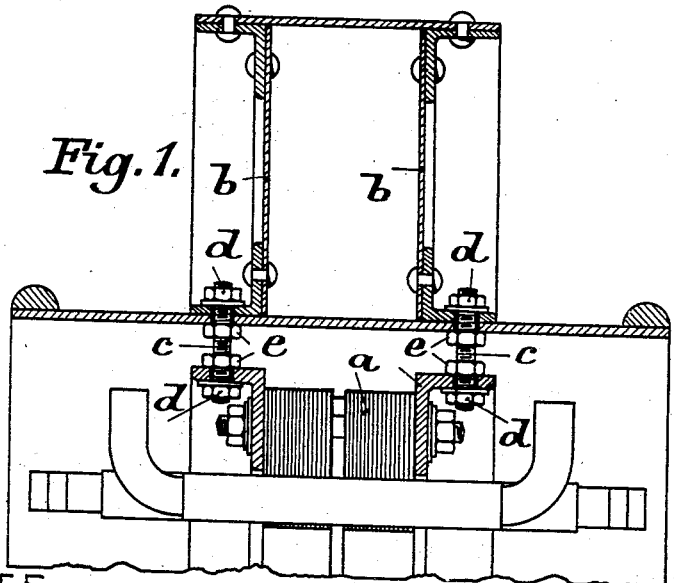

No. 763,845. Patented June 28, 1904.

UNITED STATES PATENT OFFICE.

HANS BÖHMLÄNDER AND RUDOLF PFEIFER, OF CHARLOTTENBURG, NEAR BERLIN, GERMANY.

MEANS FOR SECURING THE STATORS AND ROTORS OF ELECTRICAL MACHINES IN ADJUSTABLE RELATION.

SPECIFICATION forming part of Letters Patent No. 763,845, dated June 28, 1904.

Application filed February 24, 1902. Serial No. 95,331. (No model.)

*To all whom it may concern:*

Be it known that we, HANS BÖHMLÄNDER, engineer, residing at 7 Leibnirstrasse, and RUDOLF PFEIFER, engineer, residing at 71 Schlüterstrasse, Charlottenburg, near Berlin, Germany, subjects of the German Emperor, have invented certain new and useful Improvements in Means for Securing the Stators and Rotors of Electrical Machines in Adjustable Relation; and we do hereby declare the following to be a full, clear, and exact description of the invention, such as will enable others skilled in the art to which it appertains to make and use the same.

This invention relates to means for securing iron rings in the casings of electrical machines and motors in such a manner that the said rings which constitute the active iron body of the machine are capable of being adjusted to an accurately-concentric position relatively to the rotor, this being effected by means of adjusting contrivances interposed at numerous points of the circumference between the inner circumference of the casing and the outer circumference of the iron rings.

We will describe the mode of carrying out the said invention with reference to the accompanying drawings, in which—

Figure 1 shows a part cross-section through the annular casing and the active annular body of an electrical machine or motor arranged according to the said invention. Fig. 2 shows a front view of the entire casing on a smaller scale. Fig. 3 shows a part front view of a somewhat modified arrangement. Figs. 4 and 5 show, respectively, a front view and enlarged part cross-section of another modified construction.

In the construction shown at Figs. 1 to 3 the active iron body $a$ is connected to the casing or frame $b$ by means of intermediate adjustable appliances $c$—such as screw-bolts, wedges, or combinations hereof and the like—arranged round the entire circumference of the said parts and operating in such manner that, on the one hand, they are made to effect the adjustment of the active iron body, so as to bring it into an accurately-concentric position relatively to the rotor and after thus establishing a uniform air-gap between the rotor and stator to firmly fix the active iron body $a$ to the frame or casing $b$. For this purpose, as shown by way of example in the drawings, screw-bolts $c$, provided with two nuts $d$, and counter-nuts $e$ are employed for securing the ring $a$ to the framing $b$, so that by a suitable adjustment of the said screw bolts and nuts all round the ring $a$ any inequalities that may occur in its radial position can be readily corrected. By making the holes through which the screw-bolts $c$ pass more or less enlarged or slotted, as shown, any inaccuracies that may occur in the relative axial positions can also be corrected.

In the construction shown in Figs. 1 and 2 the intermediate appliances $c$ fulfil both the requisite functions—namely, the securing of the ring $a$ to the casing $b$, as also the production of a uniform air-gap between the rotor and stator. These two functions can, however, be carried out by two separate appliances, as shown at Fig. 3, the fixing of the ring $a$ to the casing $b$ being effected by the intermediate devices $f$, while the concentric adjustment of $a$ is effected by the devices $g$.

In the arrangement shown at Figs. 4 and 5 the arrangement is such that the construction of the casing is rendered independent of the width of the active iron ring, it being possible to shift the planes in which the fixing and adjusting devices operate relatively to the ring. For this purpose the active iron ring $a$ has dovetail grooves $n$ formed in its outer periphery, in which are fitted dovetail bars $h$, that are formed with threaded holes, into which are screwed the fixing-screws $i$. The forces exerted by the screws are thus transmitted through the bars to the iron ring, and on account of the dovetail form of the grooves and bars the screws may either be made to exert a pressure or a tensional force upon the ring, or, in other words, a force may be exerted either in one direction or the other upon the ring.

Having now particularly described and ascertained the nature of our said invention and the manner in which the same is to be performed, we declare that what we claim is—

1. In an electric machine, the combination, with a supporting-frame, and a stator-core, of a series of screw-bolts arranged at intervals and securing the core to the frame, and other adjustable screw-bolts arranged intermediate the securing-bolts and serving to regulate the distance intervening between the core and frame.

2. In an electric machine, the combination, with a supporting-frame, and a stator-core, of a series of screw-bolts arranged at intervals and securing the core to the frame, and other adjustable screw-bolts alternating with the securing-bolts and serving to regulate the distance intervening between the core and frame.

3. In an electrical machine, means for securing the stator-core in proper relation to the rotor consisting of a supporting-frame in fixed relation to the rotor, a series of transverse dovetail grooves at intervals in the periphery of the core, transverse bars disposed in the grooves, and a series of screw-bolts arranged at intervals in the bars and serving to secure the core adjustably in the frame.

In testimony whereof we have affixed our signatures in presence of two witnesses.

HANS BÖHMLÄNDER.
    RUDOLF PFEIFER.

Witnesses:
 WOLDEMAR HAUPT,
 HENRY HASPER.